United States Patent
Kuno (10) Patent No.: US 10,112,305 B2
(45) Date of Patent: Oct. 30, 2018

(54) FAILURE DIAGNOSIS DEVICE AND FAILURE DIAGNOSIS METHOD

(71) Applicant: NISSAN MOTOR CO., LTD., Kanagawa (JP)

(72) Inventor: Masaki Kuno, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/576,174

(22) PCT Filed: May 25, 2015

(86) PCT No.: PCT/JP2015/064849
§ 371 (c)(1),
(2) Date: Nov. 21, 2017

(87) PCT Pub. No.: WO2016/189608
PCT Pub. Date: Dec. 1, 2016

(65) Prior Publication Data
US 2018/0133901 A1    May 17, 2018

(51) Int. Cl.
| G01L 3/02 | (2006.01) |
| B25J 13/08 | (2006.01) |
| B25J 19/06 | (2006.01) |
| G01L 5/00 | (2006.01) |
| G05B 19/402 | (2006.01) |
| G05B 19/416 | (2006.01) |

(52) U.S. Cl.
CPC ............. *B25J 13/085* (2013.01); *B25J 19/06* (2013.01); *G01L 5/0061* (2013.01); *G05B 19/402* (2013.01); *G05B 19/416* (2013.01); *G05B 2219/34013* (2013.01)

(58) Field of Classification Search
CPC ......... B25J 13/085; B25J 9/06; G01L 5/0061; G05B 19/402; G05B 19/416; G05B 2219/34013
USPC ..................................................... 73/862.191
See application file for complete search history.

(56) References Cited

U.S. PATENT DOCUMENTS 5,571,957 A   11/1996 Tanaka
5,631,851 A   5/1997 Tanaka et al.
(Continued)

FOREIGN PATENT DOCUMENTS

JP    H07-51998 A    2/1995
JP    H07-132440 A   5/1995
(Continued)

*Primary Examiner* — Max Noori
(74) *Attorney, Agent, or Firm* — Osha Liang LLP (57) ABSTRACT

A failure diagnosis device for a mechanical device provided with a motor as a source to drive a motion axis, and configured to acquire a moving position of the motion axis and a disturbance torque value applied to the motion axis every predetermined period, and to diagnose that a failure is occurring when the disturbance torque value is larger than a failure determination threshold, includes a maintenance effect determination unit configured to calculate a change in the disturbance torque value before and after conducting of a maintenance task when the maintenance task is conducted on the motion axis, and a failure diagnosis unit configured to re-set the failure determination threshold only when the change in the disturbance torque value is larger than a predetermined threshold.

6 Claims, 6 Drawing Sheets

(56) References Cited

U.S. PATENT DOCUMENTS

| | | |
|---|---|---|
| 5,780,725 A | 7/1998 | Tanaka |
| 6,409,495 B1 | 6/2002 | Kamiguchi et al. |
| 2003/0054573 A1* | 3/2003 | Tanaka .............. H01L 21/67276 438/4 |
| 2006/0142893 A1 | 6/2006 | Yasugi et al. |
| 2013/0258324 A1* | 10/2013 | Lee .................... G01N 21/8806 356/237.2 |
| 2018/0147735 A1* | 5/2018 | Kuno ........................ B25J 19/06 |
| 2018/0154530 A1* | 6/2018 | Kuno ........................ B25J 19/06 |

FOREIGN PATENT DOCUMENTS

| | | |
|---|---|---|
| JP | H09-174482 A | 7/1997 |
| JP | 2008-183680 A | 8/2008 |

\* cited by examiner

FAILURE DIAGNOSIS DEVICE AND FAILURE DIAGNOSIS METHOD

BACKGROUND

Technical Field

The present invention relates to a failure diagnosis device applicable to a mechanical device provided with a motor as a source to drive a motion axis, and to a method thereof.

Related Art

Patent Literature 1 has been disclosed as a conventional failure diagnosis method applicable to an articulated industrial robot. In the failure diagnosis method disclosed in Patent Literature 1, a moving position of a joint axis of a robot and disturbance torque applied to the joint axis are detected every predetermined period while the robot is in operation, and an average value of the disturbance torque is obtained for each detected moving position. Then, the average value is compared with a set threshold and the robot is diagnosed as having an abnormality or a failure when the average value exceeds the set threshold. As described above, the conventional technique has been designed to diagnose a failure based on determination as to whether or not the disturbance torque exceeds the certain set threshold. Thus, an abnormality in a robot drive system used to be detected irrespective of a motion posture of the robot or a weight of a workpiece or the like to be gripped with a robot hand.

Patent Literature 1: Japanese Patent Application Publication No. H 9-174482

SUMMARY OF INVENTION

However, if a maintenance task is conducted in such a way as to alter a grease viscosity by changing a grease in each motion axis, there may be a case where a disturbance torque value varies due to an effect of the maintenance task. In this case, continued operation of failure diagnoses by using the certain set threshold without eliminating the effect of the maintenance task may lead to frequent occurrence of diagnoses as being abnormal in spite of being normal as a matter of fact, thus causing deterioration in failure diagnosis accuracy.

In the meantime, it is also true that the disturbance toque is not always affected by every maintenance task. In this respect, a mistake may occur in detecting a failure when the set threshold is changed every time the maintenance task is conducted.

One or more embodiments of the present invention provides a failure diagnosis device and a method thereof, which are capable of improving failure diagnosis accuracy by eliminating an effect of a maintenance task only when the conducted maintenance task has the effect on disturbance torque.

In a failure diagnosis device and a method thereof according to one or more embodiments of the present invention, a change in disturbance torque value before and after conduct of a maintenance task is calculated when the maintenance task is conducted on a motion axis. Then, a failure determination threshold is re-set only when the change in disturbance torque value is larger than a predetermined threshold.

DETAILED DESCRIPTION

Embodiments of the present invention will be described below with reference to the drawings. In the description of the drawings, the same constituents are denoted by the same reference signs and explanations thereof are omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of Failure Diagnosis System]

Figure 1:
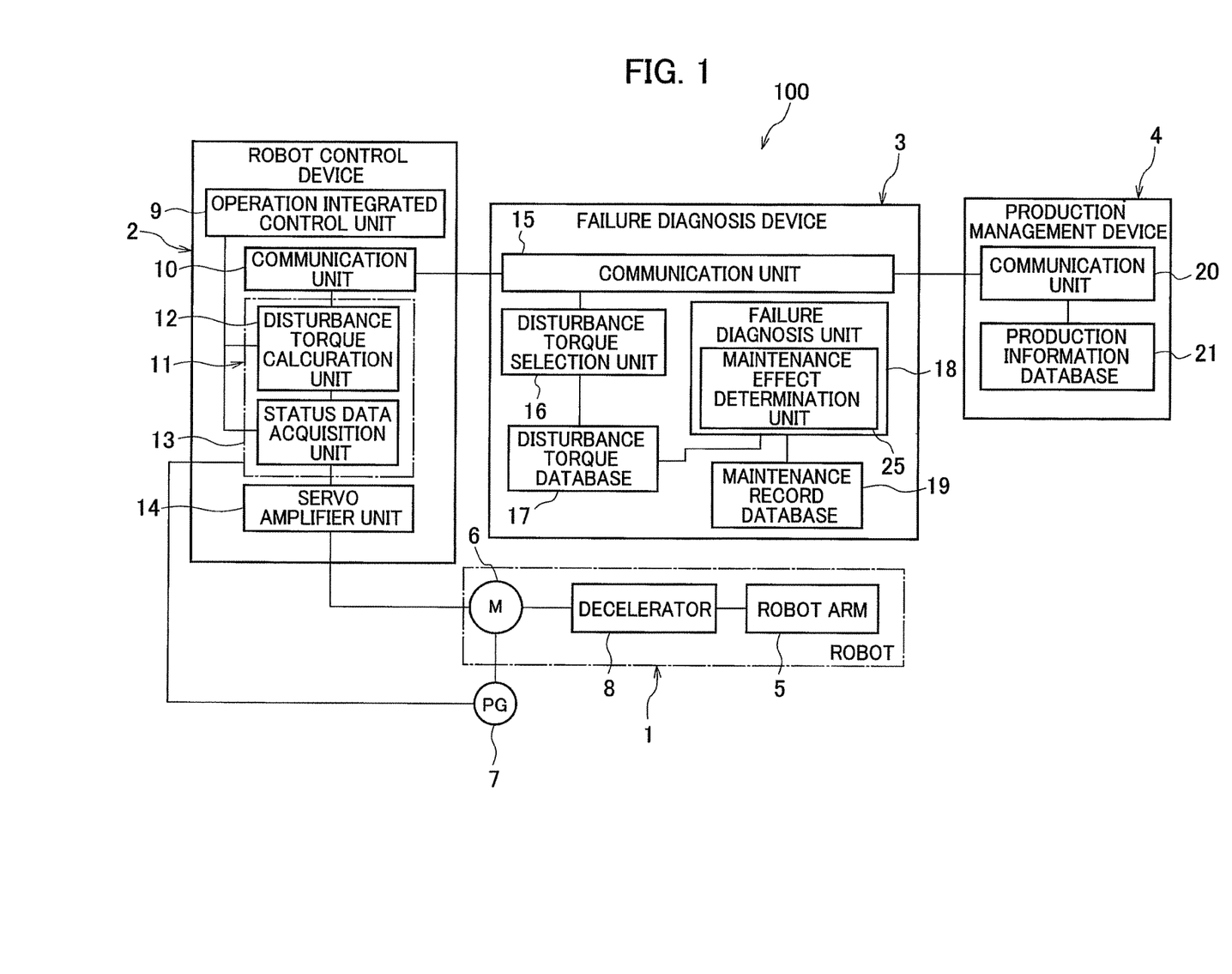
FIG. 1 is a block diagram showing an overall configuration of a failure diagnosis system according to one or more embodiments of the present invention.

FIG. 1 is a block diagram showing a configuration of a failure diagnosis system including a failure diagnosis device according to one or more embodiments of the present invention. As shown in FIG. 1, a failure diagnosis system 100 of one or more embodiments of the present invention is formed from a robot 1, a robot control device 2, a failure diagnosis device 3, and a production management device 4. As an example of a mechanical device, the robot 1 is a robot of a multi-axis-machine teaching-play back type and also of an articulated type. However, the robot 1 may be a single-axis machine instead of being the multi-axis machine.

Although the robot 1 includes multiple motor drive systems serving as joint axes that are motion axes, FIG. 1 illustrates a motor drive system just for one axis. A robot arm 5 is driven by a servo motor (hereinafter simply referred to as a motor) 6 through a decelerator 8. A pulse coder (a pulse generator or an encoder) 7 being a detector for a rotation angle position and a velocity is attached to the motor 6.

The robot control device 2 includes an operation integrated control unit 9, a communication unit 10, a servo control unit 11, and a servo amplifier unit 14. The servo control unit 11 includes a disturbance torque calculation unit 12 and a status data acquisition unit 13, and drives the motor 6 through the servo amplifier unit 14 by receiving an instruction from the host operation integrated control unit 9. The pulse coder 7 attached to the motor 6 forms a feedback loop in conjunction with the servo control unit 11 in order for control processing of the rotation angle position and the velocity of the motor 6.

In addition to the disturbance torque calculation unit 12 and the status data acquisition unit 13, the servo control unit 11 includes a processor which performs processing for controlling the rotation angle position, the velocity, and a current of the motor 6, a ROM which stores a control program, and a non-volatile storage unit which stores set values and various parameters. Moreover, the servo control unit 11 includes a RAM which temporarily stores data in the course of calculation processing, a register for detecting an absolute rotation angle position of the motor 6 by counting position feedback pulses from the pulse coder 7, and the like.

Incidentally, the robot 1 includes multiple joints and therefore requires as many motor drive systems as illustrated in FIG. 1 as the number of joints. Nonetheless, FIG. 1 illustrates the motor drive system just for one axis and illustration of the rest of the motor drive systems is omitted therein. In the meantime, a speed change gear train may be interposed between the motor 6 and the decelerator 8 in FIG. 1 as appropriate.

The operation integrated control unit 9 is ranked higher than the servo control unit 11 and governs direct control of operations of the robot 1. The communication unit 10 transfers necessary data to and from a communication unit 15 in the failure diagnosis device 3 to be described later through a LAN, for example. Meanwhile, the status data acquisition unit 13 has a function to regularly collect various types of data concerning operating statuses of the respective joint axes of the robot 1. The collected data include data indicating a collection period. The disturbance torque calculation unit 12 has a function to calculate a disturbance torque value based on the data acquired by the status data acquisition unit 13. Since the servo control unit 11 is designed to include the disturbance torque calculation unit 12 and the status data acquisition unit 13, the disturbance torque value obtained by the calculation of the disturbance torque calculation unit 12 is outputted to the failure diagnosis device 3 through the communication unit 10. According to this configuration, the servo control unit 11 takes the form of so-called software servo.

The failure diagnosis device 3 includes the communication unit 15, a disturbance torque selection unit 16, a disturbance torque database 17, a failure diagnosis unit 18, and a maintenance record database 19. Here, the failure diagnosis device 3 is formed of a general-purpose electronic circuit inclusive of a microcomputer, a microprocessor, and a CPU, and of a peripheral device such as a memory. Accordingly, the failure diagnosis device 3 operates as the communication unit 15, the disturbance torque selection unit 16, and the failure diagnosis unit 18 by executing specific programs.

The communication unit 15 has a function to transfer the necessary data to and from the communication unit 10 and 20 in the aforementioned robot control device 2 and the production management device 4 through the LAN, for example. The disturbance torque selection unit 16 has functions to acquire necessary production information from the production management device 4 and to select a value to be stored out of the disturbance torque values collected depending on the operational status of the robot 1. Meanwhile, the disturbance torque database 17 has a function to sequentially store the disturbance torque values selected by the disturbance torque selection unit 16. As a consequence, the disturbance torque database 17 accumulates previous disturbance torque values.

The maintenance record database 19 has a function to store maintenance records on the respective joint axes when maintenance tasks are conducted on the robot 1. As a consequence, the maintenance record database 19 accumulates previous maintenance record data.

The failure diagnosis unit 18 has a function to execute a failure diagnosis actively based on the disturbance torque values. The failure diagnosis unit 18 is equipped with a memory function. Hence, the failure diagnosis unit 18 temporarily stores data acquired by accessing the disturbance torque database 17 and the maintenance record database 19, respectively, and executes the failure diagnosis based on those data. In particular, the failure diagnosis unit 18 acquires a moving position of each motion axis and a disturbance torque value applied to each motion axis at each moving position every predetermined period, and diagnoses that a failure is occurring if the acquired disturbance torque value is larger than a failure determination threshold. Furthermore, the failure diagnosis unit 18 includes a maintenance effect determination unit 25, which determines an effect of a maintenance task and re-sets the failure determination threshold when the maintenance task is conducted.

The maintenance effect determination unit 25 calculates a change in disturbance torque value before and after conduct of a maintenance task when the maintenance task is conducted on the motion axis, and re-sets the failure determination threshold only when the change in disturbance torque value thus calculated is larger than a predetermined threshold. Here, the maintenance effect determination unit 25 calculates a rate of change in disturbance torque value as the change in disturbance torque value.

Specifically, the rate of change can be obtained by the following formula:

Rate of change in disturbance torque value=(average value before conduct of maintenance task−average value after conduct of maintenance task)/(average value before conduct of maintenance task).

However, the change in disturbance torque value may be derived not only from the rate of change but also from calculation of a difference between the average value before the conduct of the maintenance task and the average value after the conduct of the maintenance task. In addition, a different numerical value may be calculated when that numerical value represents the change in disturbance torque value before and after the conduct of the maintenance task.

Figure 3:
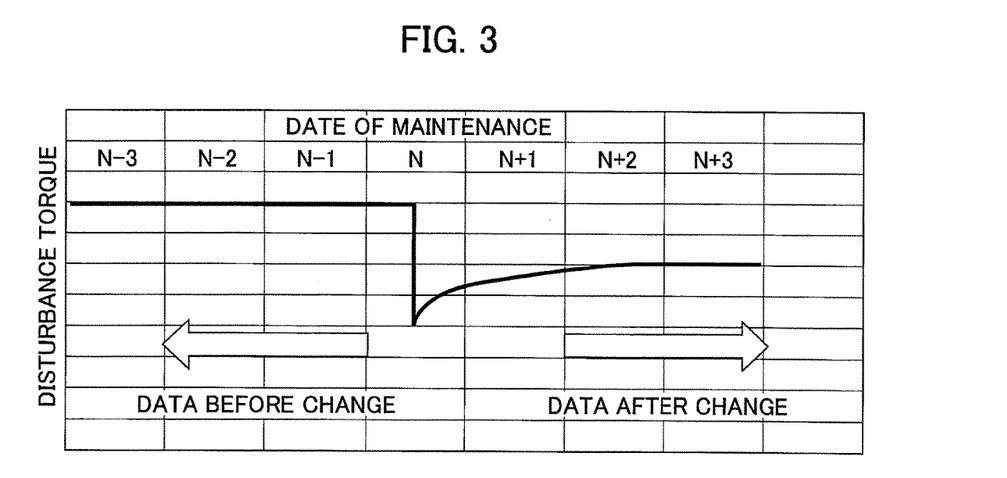
FIG. 3 is a diagram for explaining a change in disturbance torque value before and after conduct of a maintenance task.

Meanwhile, in the case of calculating the average value of the disturbance torque values after the conduct of the maintenance task, an average value of the disturbance torque values after a date on which a predetermined period has elapsed from a date of conduct of the maintenance task is calculated. For example, when the date of conductor of the maintenance task is day N as shown in FIG. 3, the average value of the disturbance torque values is calculated by using data after an (N+2)-th day, namely, data after the date on which two days have elapsed from the date of conduct of the maintenance task. This is due to the following reason. Specifically, the disturbance torque values significantly vary right after the conduct of the maintenance as shown in FIG. 3, so that the average value can be calculated more accurately by calculating the average value after the change is calmed. Here, the case of using the data after two days from the date of conduct of the maintenance task is explained in FIG. 3. However, the period required for stabilization of the disturbance torque values after the conduct of the maintenance task varies depending on the contents of the maintenance task and/or the motion axes subjected to the maintenance task. For this reason, a given period after the conduct of the maintenance task may be set on a case-by-case basis.

The production management device 4 is a device to manage production information including an operating status of a production line in a plant, for example. The production management device 4 includes a communication unit 20 and a production information database 21. The communication unit 20 transfers the necessary data to and from the communication unit 15 in the failure diagnosis device 3 through the LAN, for example. The production information database 21 has a function to store a variety of collected production information. As a consequence, the production information database 21 accumulates a variety of previous production information. Here, the production information includes emergency stop information on the robot 1 and its incidental equipment as well as information on maintenance records and the like.

Here, in one or more embodiments of the present invention, disturbance torque (disturbance load torque) applied to the motor 6 that drives each joint axis of the robot 1 is detected and an abnormality of the corresponding motor drive system is diagnosed as a failure of the robot based on this disturbance torque value. Procedures to obtain the disturbance torque are as follows.

Figure 2:
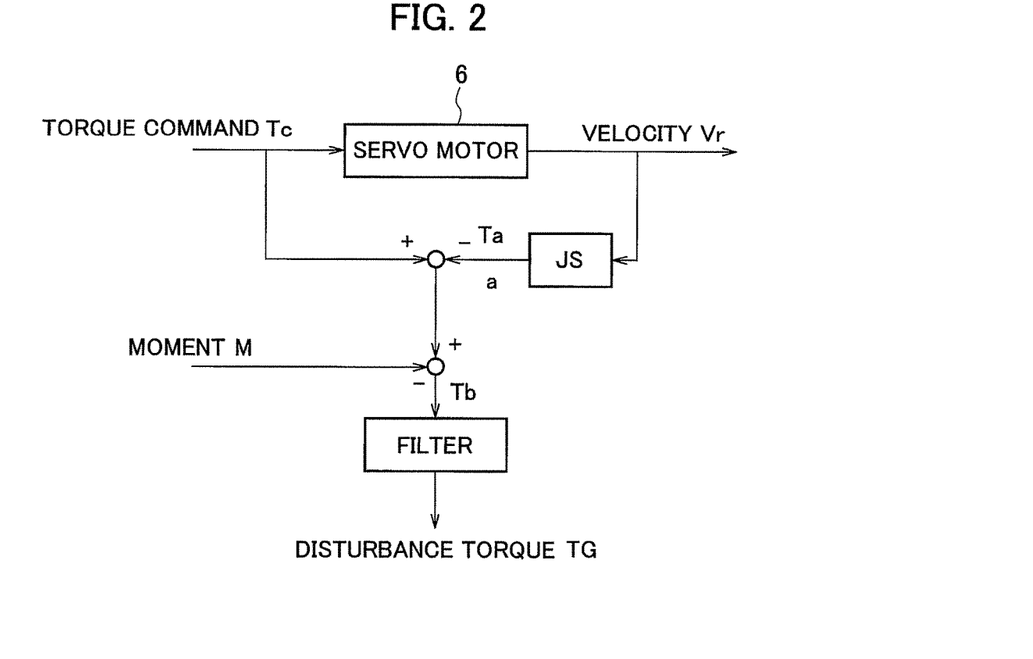
FIG. 2 is a block diagram for explaining procedures to obtain disturbance torque.

As shown in a block diagram in FIG. 2, an acceleration rate is obtained by differentiating actual velocities Vr of the motor 6 derived from velocity feedback signals from the pulse coder 7, and then acceleration torque Ta is obtained by multiplying the acceleration rate by all inertia J to be applied to the motor 6. Next, the obtained acceleration torque Ta is subtracted from a torque command Tc to the motor 6 obtained by velocity loop processing by the servo control unit 11, and a moment M is further subtracted therefrom to obtain disturbance torque Tb. Thereafter, irregular components of the disturbance are removed by conducting given filtering processing, and disturbance torque TG is thus obtained. The servo control unit 11 executes the above-described processing every predetermined sampling period, thereby obtaining the disturbance torque TG.

To be more precise, the servo control unit 11 includes a register, and the register obtains an absolute position of the motor 6 by counting the position feedback pulses from the pulse coder 7 every predetermined sampling period. Accordingly, the servo control unit 11 detects the absolute position of the motor 6 from the register, and obtains the rotation angle position (the moving position) of the joint axis driven by the motor 6 from the absolute position of the motor 6. Moreover, the servo control unit 11 obtains the disturbance torque TG by performing the processing of FIG. 2 as described previously.

[Disturbance Torque Selection Processing]

Figure 4:
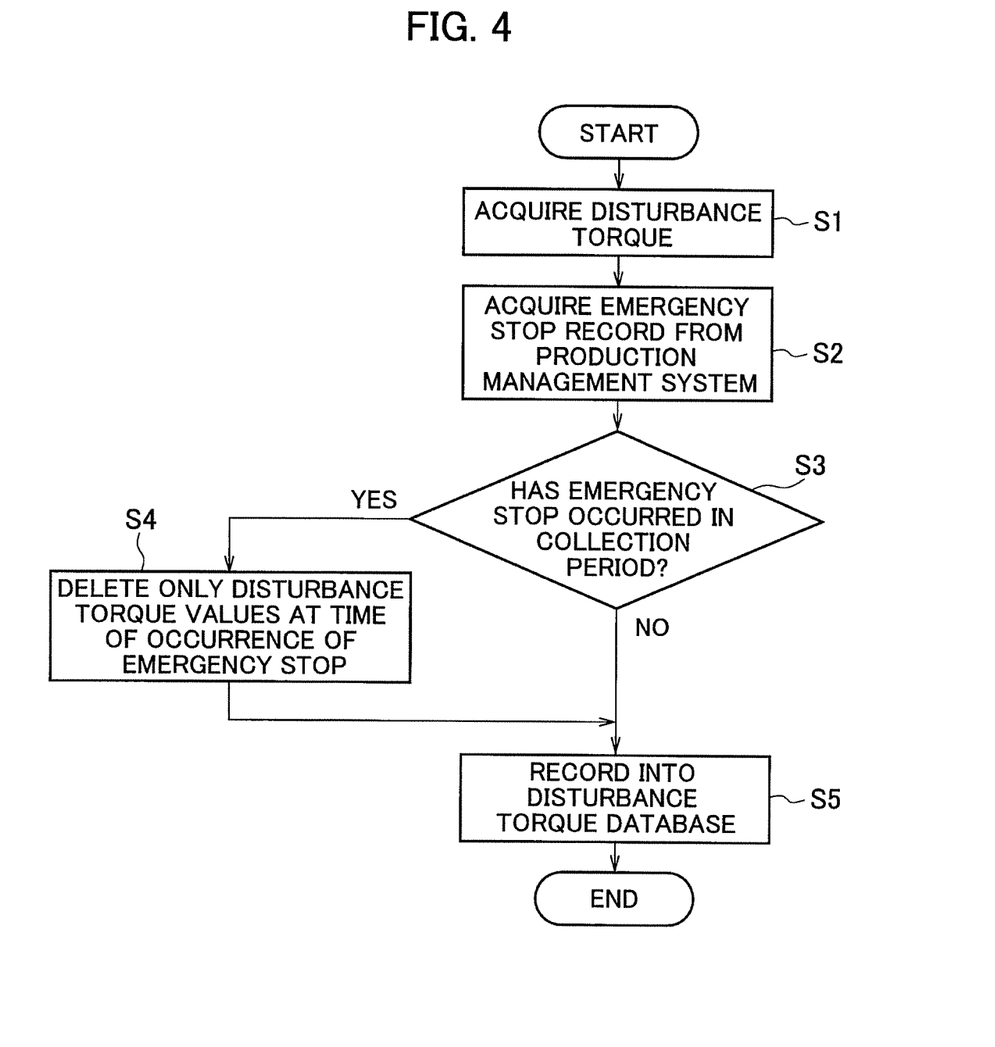
FIG. 4 is a flowchart showing procedures of disturbance torque selection processing by a failure diagnosis device according to one or more embodiments of the present invention.

Next, disturbance torque selection processing by the disturbance torque selection unit 16 of the failure diagnosis device 3 according to one or more embodiments of the present invention will be described with reference to FIG. 4. FIG. 4 is a flowchart showing procedures of the disturbance torque selection processing by the disturbance torque selection unit 16.

As shown in FIG. 4, in step S1, the disturbance torque selection unit 16 acquires the disturbance torque values calculated by the robot control device 2. Each disturbance torque value represents a value at each moving position of each motion axis. Moreover, information indicating a data collection period for the disturbance torque values is also acquired at the same time.

Next, in step S2, the disturbance torque selection unit 16 acquires the emergency stop information on a facility from the production information database 21 in the production management device 4. In step S3, the disturbance torque selection unit 16 determines whether or not the emergency stop of the facility occurred in the collection period for the acquired disturbance torque values. The processing proceeds to step S4 in the case of determination that the emergency stop occurred. On the other hand, the processing proceeds to step S5 in the case of determination that the emergency stop did not occur.

In step S4, the disturbance torque selection unit 16 deletes only the disturbance torque values at the time of occurrence of the emergency stop out of the acquired disturbance torque values, and then the processing proceeds to step S5. In step S5, the disturbance torque selection unit 16 records the acquired disturbance torque values into the disturbance torque database 17, and terminates the disturbance torque selection processing according to one or more embodiments of the present invention.

By selecting the disturbance torque values through the above-described processing, the disturbance torque database 17 stores and accumulates only the disturbance torque values that do not include abnormal values attributed to the emergency stop of the facility.

[Failure Diagnosis Processing]

Figure 5:
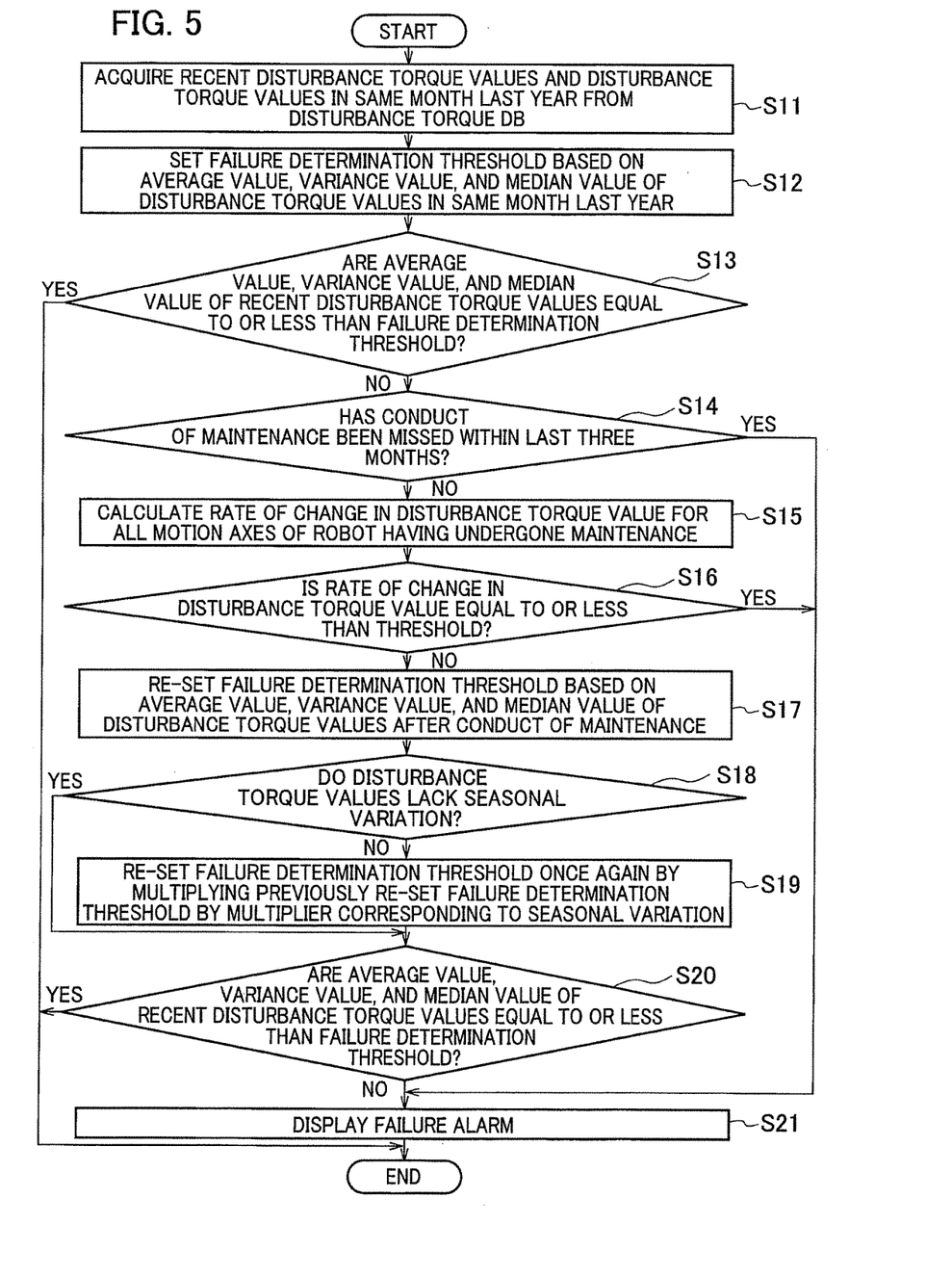
FIG. 5 is a flowchart showing procedures of failure diagnosis processing by the failure diagnosis device according to one or more embodiments of the present invention.

Next, failure diagnosis processing by the failure diagnosis unit 18 of the failure diagnosis device 3 according to one or more embodiments of the present invention will be described with reference to FIG. 5. FIG. 5 is a flowchart showing procedures of the failure diagnosis processing by the failure diagnosis unit 18.

As shown in FIG. 5, in step S11, the failure diagnosis unit 18 acquires the recent disturbance torque values as well as disturbance torque values in the same month last year as the date the diagnosis takes place in a lump from the disturbance torque database 17. In step S12, based on the disturbance torque values in the same month last year as the date the diagnosis takes place, the failure diagnosis unit 18 calculates at least one (or more) of an average value, a variance value, and a median value thereof, and then calculates and sets a failure determination threshold based on the calculated value. For example, any one of the average value, the variance value, and the median value may be set to the failure determination threshold or two or more of these values may be set to the failure determination thresholds.

In step S13, the failure diagnosis unit 18 calculates at least one (or more) of the average value, the variance value, and the median value of the recent disturbance torque values, and determines whether or not the calculated value is equal to or less than the failure determination threshold set in step S12. Then, if the calculated value out of the average value, the variance value, and the median value of the recent disturbance torque values is equal to or less than the failure determination threshold, then the failure diagnosis unit 18 determines that a failure is not occurring, and immediately terminates the failure diagnosis processing according to one or more embodiments of the present invention. On the other hand, if the calculated value out of the average value, the variance value, and the median value of the recent disturbance torque values is larger than the failure determination threshold, then the failure diagnosis unit 18 determines that there is a possibility of a failure, and the processing proceeds to step S14.

In step S14, the failure diagnosis unit 18 determines whether or not maintenance has been conducted within the last three months based on the data accumulated in the maintenance record database 19. Then, if no maintenance has been conducted, the failure diagnosis unit 18 determines that the failure is occurring, and the processing proceeds to step S21. On the other hand, the processing proceeds to step S15 for determining the effect of the maintenance task when the maintenance has been conducted within the last three months.

In step S15, the maintenance effect determination unit 25 calculates the rate of change in disturbance torque value before and after the conduct of the maintenance task for all the motion axes of the robot which underwent the maintenance task. The robot that underwent the maintenance task includes the multiple motion axes, and some of the motion axes underwent the maintenance task while other motion axes did not undergo the maintenance task. This is due to the reason that some motion axes have to undergo a maintenance task frequently while other motion axes do not have to undergo a maintenance task for a long period of time. Here, the rate of change in disturbance torque value is calculated for all these motion axes. Note that a difference in disturbance torque value before and after the conduct of the maintenance task may be calculated instead of the rate of change in disturbance torque value.

In step S16, the maintenance effect determination unit 25 determines whether or not each rate of change in disturbance torque value calculated in step S15 is equal to or less than a predetermined threshold. When the rate of change is equal to or less than the predetermined threshold, the maintenance effect determination unit 25 determines that there is no effect of the maintenance task and that a failure is occurring, and the processing proceeds to step S21. On the other hand, when the rate of change in disturbance torque value is larger than the predetermined threshold, the maintenance effect determination unit 25 determines that there is an effect of the maintenance task, and the processing proceeds to step S17. In other words, for all the motion axes of the robot which underwent the maintenance task, this step determines whether or not the disturbance torque value is significantly changed by the effect of the maintenance task.

In step S17, the failure diagnosis unit 18 calculates at least one (or more) of an average value, a variance value, and a median value of disturbance torque values after the conduct of the maintenance task, and calculates and re-sets a failure determination threshold based on the value. At this time, in the case of calculating any of the average value, the variance value, and the median value of disturbance torque values after the conduct of the maintenance task, such a value is calculated by using the disturbance torque values after the date on which the predetermined period has elapsed from the date of conduct of the maintenance task, since the disturbance torque values may significantly vary and therefore be unstable right after the conduct of the maintenance as described by using FIG. 3.

In step S18, the failure diagnosis unit 18 determines whether or not there is a seasonal variation in the disturbance torque values of any of the joint axes. The processing proceeds to step S20 when there is not the seasonal variation or proceeds to step S19 when there is the seasonal variation. Here, the determination as to whether or not there is the seasonal variation in the disturbance torque values is made by using a degree of correlation between fluctuations in external temperature in each season and the disturbance torque values, for example. Such determination can be made by checking separately accumulated data of the external temperatures with the data of the disturbance torque values.

In step S19, the failure diagnosis unit 18 re-sets a failure determination threshold once again by multiplying the failure determination threshold that is re-set in step S17 by a constant (a coefficient) corresponding to the seasonal variation.

In step S20, the failure diagnosis unit 18 determines whether or not at least one (or more) of the average value, the variance value, and the median value of the recent disturbance torque values of the corresponding joint axis is equal to or less than either the failure determination threshold that is re-set once or the failure determination threshold that is re-set twice. Then, if the calculated value out of the average value, the variance value, and the median value of the recent disturbance torque values is equal to or less than any of these failure determination thresholds, then the failure diagnosis unit 18 determines that a failure is not occurring, and terminates the failure diagnosis processing according to one or more embodiments of the present invention. On the other hand, if the calculated value out of the average value, the variance value, and the median value of the recent disturbance torque values is larger than the corresponding failure determination threshold, then the failure diagnosis unit 18 determines that a failure is occurring, and the processing proceeds to step S21.

In step S21, the failure diagnosis unit 18 displays a failure alarm on the corresponding joint axis on a display screen of a not-illustrated monitor that is installed as an attachment to the failure diagnosis device 3, and the failure diagnosis processing according to one or more embodiments of the present invention is terminated.

Figure 6:
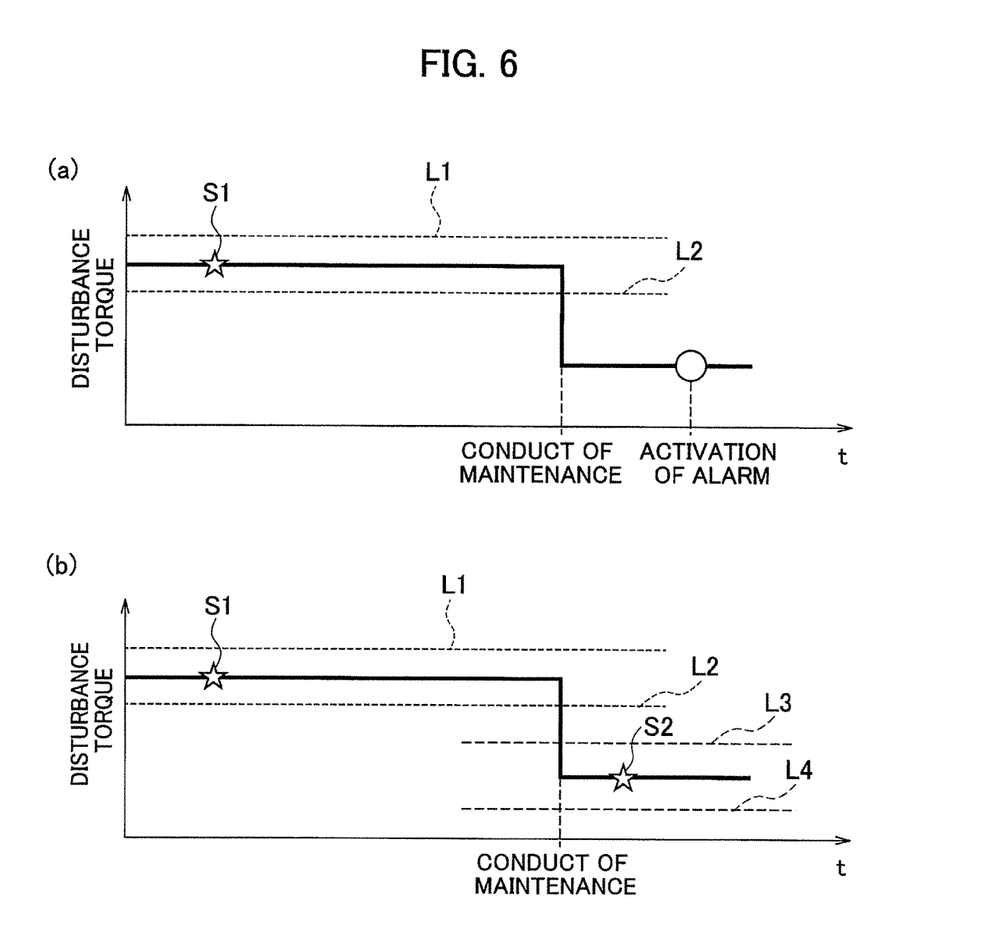
FIGS. 6(a)-6(b) show diagrams for explaining an effect of the failure diagnosis device according to one or more embodiments of the present invention.

Next, effects of the failure diagnosis device 3 according to one or more embodiments of the present invention will be described. First of all, when the maintenance task is conducted on the motion axes of the multi-axis machine, the disturbance torque values may cause a significant change in waveform. In this case, since the failure determination threshold is fixed in the related art, there may be a case of erroneous determination of a failure even though the motion axes are normal even after the conduct of the maintenance task. As shown in FIG. 6(a), for example, failure determination thresholds L1 and L2 are set with respect to a reference value S1 of the disturbance torque before the conduct of the maintenance task, respectively. In this case, if the failure determination thresholds L1 and L2 remain fixed even when the conduct of the maintenance task causes a significant change in disturbance torque value, an alarm is activated as a consequence of erroneous determination of a failure after the conduct of the maintenance task.

On the other hand, when the maintenance task is conducted, the failure diagnosis device 3 according to one or more embodiments of the present invention calculates the change in disturbance torque value before and after the conduct of the maintenance task, and re-sets the failure determination thresholds when the change in disturbance torque value is larger than the predetermined threshold. As shown in FIG. 6(b), for example, in the case where the failure determination thresholds L1 and L2 are set with respect to the reference value S1 of the disturbance torque before the conduct of the maintenance task, respectively, failure determination thresholds L3 and L4 are re-set with respect to a new reference value S2 when the maintenance task is conducted. This makes it possible to improve failure diagnosis accuracy while preventing erroneous determination even when the maintenance task is conducted.

Figure 7:
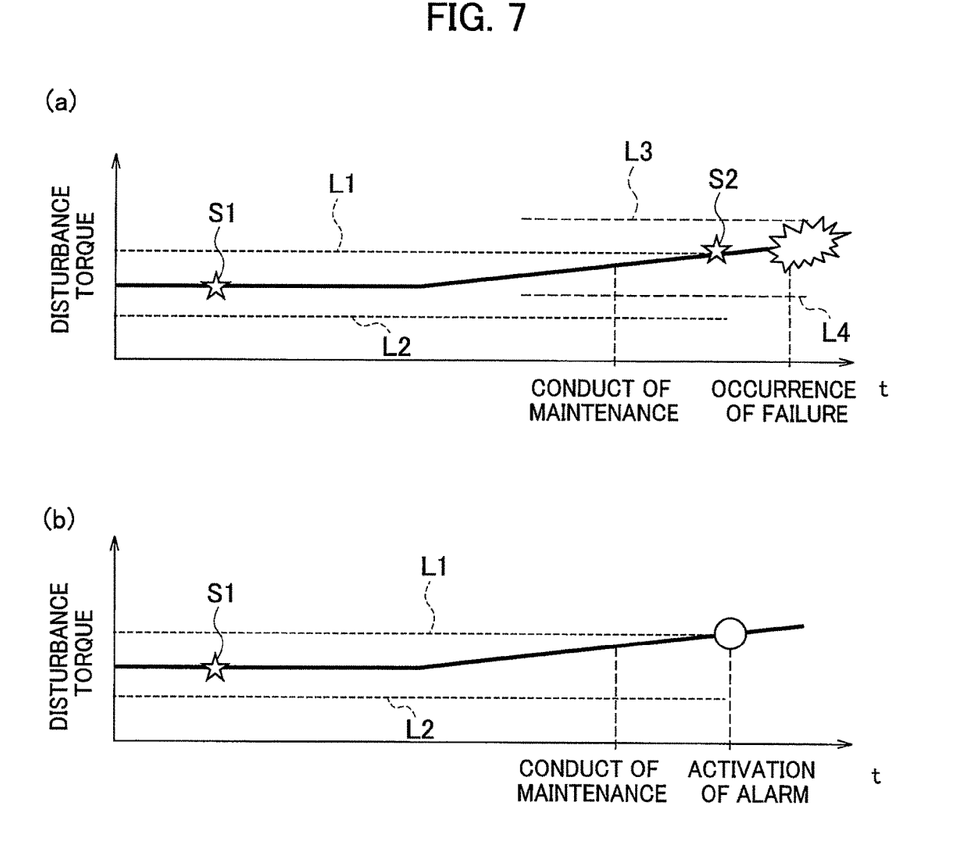
FIGS. 7(a)-7(b) show diagrams for explaining the effect of the failure diagnosis device according to one or more embodiments of the present invention.

However, there may be a case of practically relaxing the failure determination thresholds if the failure determination thresholds are re-set when the maintenance task not having any effect on the disturbance torque is conducted. As a consequence, there is a risk of overlooking a failure since no alarm is activated. For example, as shown in FIG. 7(a), in the case where the failure determination thresholds L1 and L2 are set with respect to the reference value S1 of the disturbance torque before the conduct of the maintenance task, respectively, the new reference value S2 and the failure determination thresholds L3 and L4 are set after the conduct of the maintenance task. However, as the failure progresses slowly, the disturbance torque values will also rise gradually. Therefore, if the failure determination thresholds are re-set by using the disturbance torque values before and after the conduct of the maintenance task, the failure determination threshold L1 is changed to the failure determination threshold L3 even though the maintenance task does not have any effect on the disturbance torque, and the threshold is relaxed. As a consequence, if the operation is continued as it is, the failure occurs without activating the alarm before the disturbance torque reaches the failure determination threshold L3.

On the other hand, when the maintenance task is conducted, the failure diagnosis device 3 according to one or more embodiments of the present invention calculates the change in disturbance torque value before and after the conduct of the maintenance task, and re-sets the failure determination thresholds only when the change in disturbance torque value is larger than the predetermined threshold. As shown in FIG. 7(b), for example, in the case where the failure determination thresholds L1 and L2 are set with respect to the reference value S1 of the disturbance torque before the conduct of the maintenance task, respectively, the reference value S1 and the failure determination thresholds L1 and L2 are not re-set when the conducted maintenance task does not have any effect on the disturbance torque. As a consequence, the alarm is activated at the point when the disturbance torque value reaches the failure determination threshold L1, so that the failure can be prevented in advance. This makes it possible to eliminate the effect of the maintenance task by re-setting the failure determination thresholds only when the conducted maintenance task has the effect on the disturbance torque, and thus to improve the failure diagnosis accuracy.

Moreover, accordingly to the failure diagnosis device 3 of one or more embodiments of the present invention, the rate of change in disturbance torque value is calculated as the change in distance torque value, so that the effect of the conducted maintenance task on the disturbance torque can be detected accurately. This makes it possible to eliminate the effect of the maintenance task only when the conducted maintenance task has the effect on the disturbance torque, and thus to improve the failure diagnosis accuracy.

Furthermore, the failure diagnosis device 3 according to one or more embodiments of the present invention calculates the change in disturbance torque value before and after the conduct of the maintenance task for each motion axis that did not undergo the maintenance task as well, and re-sets the failure determination thresholds only when the change in disturbance torque value is larger than the predetermined threshold. In this way, regarding the motion axes not subjected to the maintenance task as well, it is possible to eliminate the effect of the maintenance by re-setting the failure determination thresholds when there is the effect of the maintenance task, and thus to improve the failure diagnosis accuracy.

Meanwhile, the failure diagnosis device 3 according to one or more embodiments of the present invention calculates the change in disturbance torque value by using the disturbance torque values before the conduct of the maintenance task and the disturbance torque values after the date on which the predetermined period has elapsed from the date of conduct of the maintenance task. This makes it possible to calculate the change in disturbance torque value except the period in which the disturbance torque significantly varies right after the maintenance task, and thus to improve the failure diagnosis accuracy.

Furthermore, the failure diagnosis device 3 according to one or more embodiments of the present invention re-sets the failure determination threshold by using at least one of the average value, the variance value, and the median value of the disturbance torque values after the conduct of the maintenance task. This makes it possible to re-set the failure determination threshold reflecting the effect of the maintenance task, and thus to improve the failure diagnosis accuracy while preventing erroneous determination.

Although embodiments of the present invention are described above, it should be understood that the descriptions and the drawings constituting part of this disclosure are not intended to limit this invention. Various alternative embodiments, examples, and application techniques will be obvious to those skilled in the art from this disclosure. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 robot
2 robot control device
3 failure diagnosis device
4 production management device
5 robot arm
6 servo motor (motor)
7 pulse coder
8 decelerator
9 operation integrated control unit
10, 15, 20 communication unit
11 servo control unit
12 disturbance torque calculation unit
13 status data acquisition unit
14 servo amplifier unit
16 disturbance torque selection unit
17 disturbance torque database
18 failure diagnosis unit
19 maintenance record database
21 production information database
25 maintenance effect determination unit
100 failure diagnosis system

The invention claimed is:

1. A failure diagnosis device for a mechanical device provided with a motor as a source to drive a motion axis, and configured to acquire a moving position of the motion axis and a disturbance torque value applied to the motion axis every predetermined period, and to diagnose that a failure is occurring when the disturbance torque value is larger than a failure determination threshold, comprising:
 a maintenance effect determination unit configured to calculate a change in the disturbance torque value before and after conducting of a maintenance task when the maintenance task is conducted on the motion axis; and
 a failure diagnosis unit configured to re-set the failure determination threshold only when the change in the disturbance torque value is larger than a predetermined threshold.

2. The failure diagnosis device according to claim 1, wherein the maintenance effect determination unit calculates a rate of change in the disturbance torque value as the change in the disturbance torque value.

3. The failure diagnosis device according to claim 1, wherein the maintenance effect determination unit calculates the change in the disturbance torque value before and after the conducting of the maintenance task for a certain motion axis among a plurality of the motion axes of the mechanical device subjected to the maintenance task, and wherein the certain motion axis not undergoing the maintenance task.

4. The failure diagnosis device according to claim 1, wherein the maintenance effect determination unit calculates the change in the disturbance torque value by using disturbance torque values before the conducting of the maintenance task and disturbance torque values after a date on which a predetermined period has elapsed from a date of the conducting of the maintenance task.

5. The failure diagnosis device according to claim 1, wherein the failure diagnosis unit re-sets the failure determination threshold by using at least one of an average value, a variance value, and a median value of disturbance torque values after the conducting of the maintenance task.

6. A failure diagnosis method for a mechanical device provided with a motor as a source to drive a motion axis, and designed to acquire a moving position of the motion axis and a disturbance torque value applied to the motion axis every predetermined period, and to diagnose that a failure is occurring when the disturbance torque value is larger than a failure determination threshold, the method comprising:

calculating, via the failure diagnosis device, a change in the disturbance torque value before and after conducting of a maintenance task when the maintenance task is conducted on the motion axis; and re-setting, via the failure diagnosis device, the failure determination threshold only when the change in the disturbance torque value is larger than a predetermined threshold.

\* \* \* \* \*